United States Patent [19]

Göckler et al.

[11] 4,435,773
[45] Mar. 6, 1984

[54] RECEIVER FOR EFFECTING SYNCHRONOUS DEMODULATION

[75] Inventors: Heinz Göckler; Reinhard Till, both of Backnang; Heinrich Schenk, Munich, all of Fed. Rep. of Germany

[73] Assignee: Licentia Patent-Verwaltungs-GmbH, Frankfurt, Fed. Rep. of Germany

[21] Appl. No.: 236,823

[22] Filed: Feb. 20, 1981

[30] Foreign Application Priority Data

Feb. 23, 1980 [DE] Fed. Rep. of Germany ....... 3006801

[51] Int. Cl.³ .............................................. G06F 15/31
[52] U.S. Cl. .................................................... 364/724
[58] Field of Search ........................................ 364/724

[56] References Cited

U.S. PATENT DOCUMENTS

4,062,060 12/1977 Nussbaumer ........................ 364/724
4,263,671 4/1981 Chiu et al. ............................ 364/724
4,285,045 8/1981 Tamori et al. ....................... 364/724

OTHER PUBLICATIONS

Leuthold, "A New Concept for the Realization of Data Modems with Integrated Digital Filters and Modulators" *Philips Res. Rept. 27* No. 3, Jun. 1972, pp. 223–243.
Roy et al., "Digital Low-Pass Filtering Using the Discrete Hilbert Transfom" *IEEE Trans. on Acoustics, Speech and Signal Processing,* vol. ASSP-26, No. 5, Oct. 1978, pp. 465–467.
Murano et al., "LSI Processor for Digital Signal Processing & its Application to 4800 Bit/s Modem" *IEEE Trans. on Communications,* vol. Com-26, No. 5, May 1978, pp. 499–506.
Puckette, "Bucket-Brigade Tranversal Filter" *IEEE Trans. on Communications* vol. Com-22, No. 7, Jul. 1974, pp. 926–934.
Ibrahim et al. "Double-Split-Electrode Transversal Filter for Telecommunication Applications" *IEEE J. of Solid-State Circuits,* vol. SC-14, No. 1, Feb. 1979, pp. 80–84.
Schirm IV, "Multiplier-Accumulator Application Notes" *TRW LSI Products* El Segundo, CA. Jan. 1980, pp. 1–14.
Akashi et al., "A High Performance Digital QAM 9600 bit/s Modem" *NEC Research and Development,* No. 45, Apr. 1977, pp. 38–49.
Van Gerwen et al., "Microprocessor Implementation of High-Speed Data Modems" *IEEE Trans. on Communications* vol. Com-25, No. 2, Feb. 1977, pp. 238–250.
Bedrosian "Normalized Design of 90° Phase-Difference Networks" *IRE Trans. on Circuit Theory* Jun. 1960, pp. 128–136.
Kammeyer et al., "Ein Flexibles Experimentiersystem für die Datenübertragung im Fernsprechbereich" *Frequenz* 33, No. 5, pp. 141–145 and No. 6, pp. 165–172; 1979.
Göckler et al., "Zum Entwurf Transversaler Filterpaare unter Berücksichtigung von Forderungen im Frequenz-und Zeitbereich" *AEG-Telefunken Scientific Reports,* vol. 53, 1980, Nos. 4–5, pp. 154–160.
Schenk "Methoden zur Verbesserung des Übertragungsverhaltens beim Einsatz von digitalen Entzerrern und Impulsformern" *Archives for Electronics and Transmission Techniques,* vol. 32, pp. 301–307, 1978.
Bennett, "Data Transmission" McGraw Hill Book Co., N.Y., 1965 pp. 96–111 and 201–209.
Haviland et al., "A Cordic Arithmetic Processor Chip" *IEEE J. of Solid State Circuits,* vol. SC-15, No. 1, Feb. 1980 pp. 4–15.

*Primary Examiner*—David H. Malzahn
*Attorney, Agent, or Firm*—Spencer & Frank

[57] ABSTRACT

In a receiver for synchronously demodulating real bandpass signals and including circuit elements connected for removing noise, equalizing the signals, converting the resulting signals to analytical signals, shifting the signals in phase, sampling the signals at the signal element timing rhythm, and interrogating the sampled signals, there is provided a single pair of filters serving to perform both the equalizing and converting functions.

5 Claims, 4 Drawing Figures

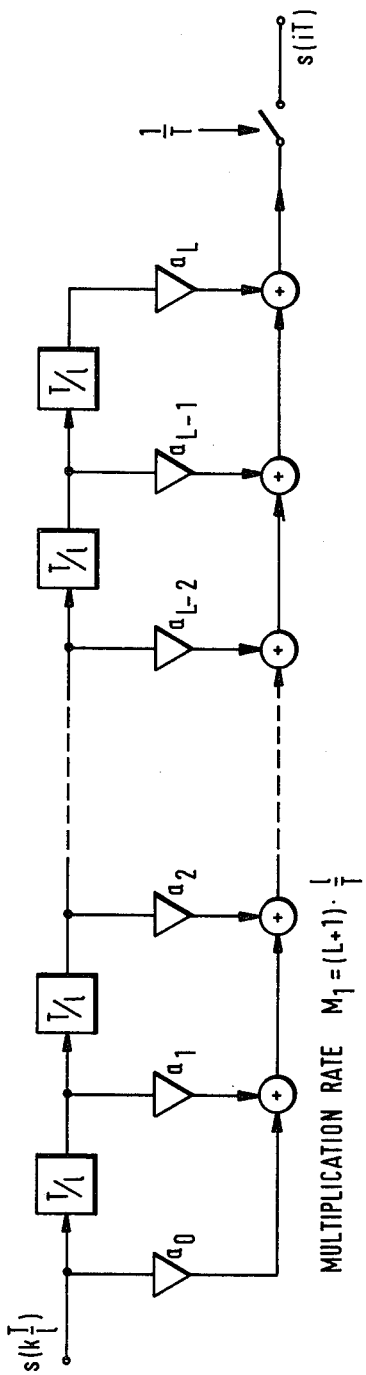
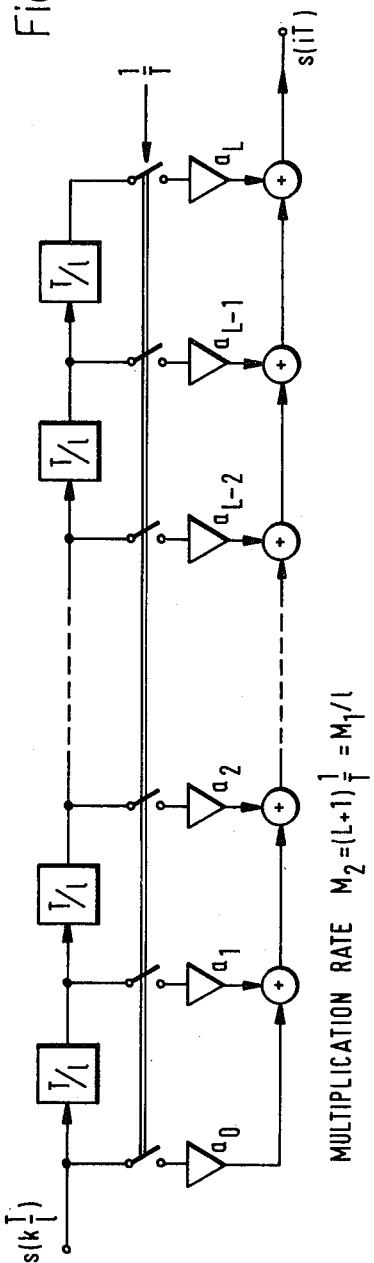

RECEIVER FOR EFFECTING SYNCHRONOUS DEMODULATION

BACKGROUND OF THE INVENTION

The present invention relates to a receiver for the synchronous demodulation of real bandpass signals which have been freed from interference or distortion, respectively, by means of filters. After such filtering, the signals are converted by means of a pair of Hilbert filters into analytical signals which are shifted in phase by means of a phase shifting member, are scanned at the rate of the signal element timing rhythm, and are interrogated in a decider.

Such receivers are disclosed, for example, in the article entitled, "A High Performance Digital QAM 9600 bit/sec Modem" by Akashi et al., published in NEC Research & Development No. 45, April 1977, at pages 38, et seq.; the article entitled, "Microprocessor Implementation of High-Speed Data Modems" by Gerwen et al., published in IEEE Trans. on Communications, Vol. COM-25, No. 2, February, 1977, pages 238 et seq.; and the article entitled "Ein flexibles Experimentiersystem für die Datenübertragung im Fernsprechbereich" [A Flexible Experimental System for Data Transmission in the Telephone Art] by Kammeyer and Schenk, published in Frequenz (Frequency) 33, 1979, No. 5, pages 141-145 and No. 6, pages 165-172.

Data receivers, such as those mentioned above, usually employ quadrature amplitude modulation and mainly employ time sampling or digital signal processing.

In all data receivers of this type, the individual functions are realized in separate filter arrangements, for example, the synchronous demodulation with phase separation is performed in a digital pair of Hilbert filters, the optimum noise suppression in a matched filter, and the signal equalization in a special equalizer filter. With fast operating data transmission instruments, the above-mentioned other filters are necessary in addition to the pair of Hilbert filters to achieve a low bit error rate, so that the circuitry becomes relatively complicated.

SUMMARY OF THE INVENTION

It is, therefore, an object of the present invention to significantly reduce the circuitry required in a receiver of the above-mentioned type.

The above and other objects are achieved, according to the invention, in a receiver for synchronously demodulating real bandpass signals and including means connected for removing noise, means connected for equalizing the signals, means connected for converting the resulting signals to analytical signals, phase shifting means connected for shifting the signals in phase, sampling means connected for sampling the signals at the signal element timing rhythm, and a decider connected for interrogating the sampled signals, by the provision of a single pair of filters constituting both the equalizing means and the converting means.

The receiver according to the invention makes it possible to reduce the total circuitry required to perform the filter functions. With time-discrete or digital implementation of the filter functions, there exists the particular advantage that all filter component groups are able to operate at the low signal element timing rhythm and do not require the high scanning timing rhythm for multiplication.

BRIEF DESCRIPTION OF THE DRAWING

FIG. 3a shows a general transversal filter as a tapped delay line.

FIG. 3b is a diagram of a transversal filter exploiting the fact that the sampling frequency required at the output is reduced with respect to its input, thus leading to a reduction of the multiplication rate.

DESCRIPTION OF THE PREFERRED EMBODIMENTS

Figure 1:
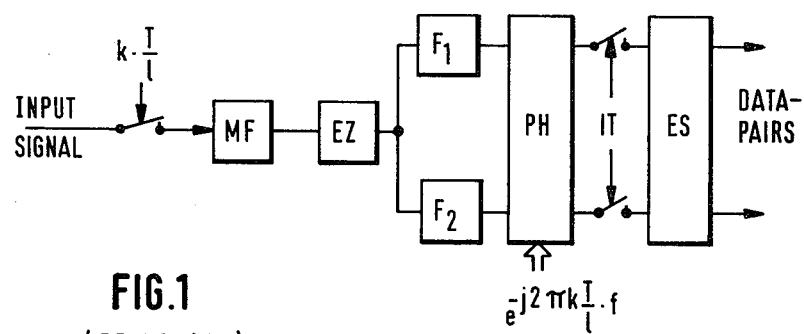
FIG. 1 is a block circuit diagram of a prior art receiver.

FIG. 1 is a block circuit diagram for a prior art QAM receiver wherein the input signal received from an associated channel, and generally containing noise and being linearly distorted, is sampled at a sampling frequency which satisfies the scanning theorem, by operation of an element represented schematically as a switch. The sampled signal is fed to a matched filter MF for limiting the noise or for optimum noise suppression, respectively. Thereafter, the signal is equalized in an equalizing filter EZ and is fed to a pair of Hilbert filters $F_1$ and $F_2$, where a complex signal is derived from the common real input signal. This complex signal has spectral components only at positive frequencies, i.e., is an analytical signal.

The desired complex data signal is obtained precisely when the phase curves of the two filters $F_1$ and $F_2$ in the frequency range of interest differ by $\pi/2$ and the attenuation curve exhibits an allpass characteristic. Thereafter, a phase shift takes place in a phase shifting member Ph by the value $2 \cdot k \cdot (T/l) \cdot f$, where $(T/l)$ is the sampling time with $l \neq 0$ being an integer number, f is the carrier frequency, T the length of the signal element timing period and k the number of sampling values, or steps.

After the phase shift, sampling takes place at the signal element timing rhythm $i \cdot T$ and interrogation in a decider Es whose output provides the demodulated data pairs. T is the time between the arrival of any two subsequent signal elements to be received. The integer number $l$ indicates—for time discrete or digital signal processing—the factor by which the sampling time interval at the receiver front end is reduced relative to the signal element sampling time interval. The integer figure k is related to the sampling instants at the receiver front end; the integer figure i relates to the sampling instants of the signal elements.

Figure 2:
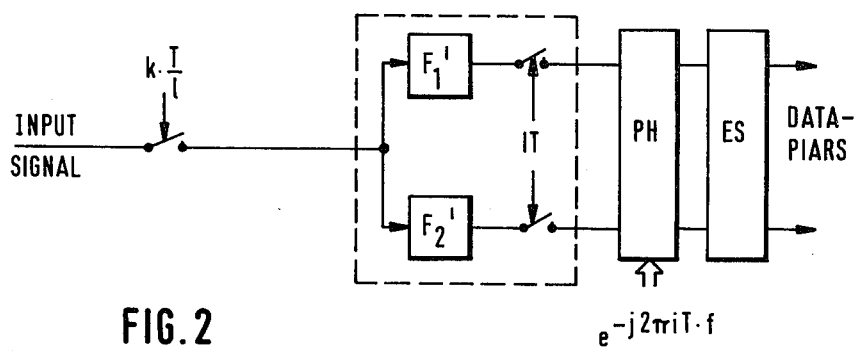
FIG. 2 is a similar diagram of a preferred embodiment of a receiver according to the present invention.

FIG. 2 shows an embodiment of the invention in which the filter functions of MF, EZ, $F_1$ and $F_2$ of FIG. 1 are combined in a single pair of filters $F_1'$ and $F_2'$. The sampling in the signal element timing rhythm here occurs before the phase shift in shifter Ph and has been included in the filter block. The advantage of this arrangement is that the entire quadrature filter block can operate at the signal element timing rhythm T, resulting in a low multiplication rate while the two filters MF and EZ according to FIG. 1 must operate at the higher scanning and multiplication rate (l/T).

The arrangement according to the invention results in a further advantage that with different distortions which depend, for example, on the selected connection, the transfer function of the filter pair can simply be switched so that optimum data reception is made possible.

For the embodiment of the filters $F_1$ and $F_2$ there are various possibilities. First, in contrast to the example of FIG. 1, an analog implementation is given by S. D. Bedrosian, IRE Trans. Circ. theory, vol. 7, pp. 128–136, 1960 entitled "Normalized Design of 90° Phase Difference Networks." There, a pair of allpass filters, implemented with coils and capacitors, is used to perform a 90° phase difference at the output ports of the two filters. This approach does not require any timing and control circuitry.

With time-discrete or digital implementations, transversal filters may, for instance, be applied (FIG. 3a). Such a filter consists of a tapped delay line, where the frequency response of such a filter is determined by the weighting (tap) coefficients $a_o, a_1, a_2, \ldots a_L$. A time-discrete embodiment of a transversal filter $F_1$ or $F_2$, respectively, using charge couled devices (CCD) is for instance, given by Puckette et al. IEEE Trans Comm., vol. COM-22, pp. 926–934, July 1974 and by Ibrahim et al, IEEE J Solid State Circ., vol. SC-14, pp. 80–84, February 1979. Corresponding digital embodiments including timing and control circuitry can, for example, be found in U.S. Pat. No. 4,062,060 (December 1977) or in L. Schirm "Multiplier-Accumulator Application Notes" TRW LSI Products, El Segundo, CA. 90245, January 1980.

The filters $F_1'$ and $F_2'$, respectively, according to the invention can be embodied in the same way as the filters $F_1$ and $F_2$. However, the values of the coefficients are different. If, for example, transversal filters according to FIG. 3a are used in the receiver according to FIG. 2, the multiplication rate can substantially be reduced, if the subsampling switch at the filter output is drawn into the filter according to FIG. 3b. Thus, this switch is replaced by a bank o synchronously driven switches in front of the multipliers so that fewer multiplications per second must be carried out. Detailed description of all other blocks of FIGS. 1 and 2, particularly of the phase rotating circuit Ph and the decision device Es, can be found in "Data Transmission" by W. R. Bennett and J. R. Davey, McGraw Hill Book Co., New York, 1965.

Especially, a great variety of signals which can be processed with the receiver according to the invention are dealt with in this book.

It is to be understood that the above description of the present invention is susceptible to various modifications, changes and adaptations, and the same are intended to be comprehended within the meaing and range of equivalents of the appended claims.

What is claimed is:

1. In a receiver for synchronously demodulating received sampled real bandpass signals composed of successive signal elements, said receiver containing a singal conduction path and including equalizing means connected in the path for equalizing the received signals, a pair of converting means connected in the path and operatively associated with the equalizing means for converting the signals provided by the equalizing means to analytical signals consisting of a pair of signals, a pair of sampling means connected in the path for sampling the analytical signals at time intervals corresponding to the time between successive signal elements, phase shifting means connected in the path and to the pair of sampling means for shifting the sampled signals in phase, and a decider connected in the path for interrogating the pairs of phase-shifted sampled signals, the improvement comprising a single pair of filters constituting and pair of converting means, said single pair of filters further constituting said equalizing means.

2. An arrangement as defined in claim 1 wherein said single pair of filters also constitute means for removing noise from the received sampled signals.

3. An arrangement as defined in claim 1 or 2 wherein said single pair of filters are constructed to operate in a time-discrete manner at a rate corresponding to the sampling rate of said pair of sampling means.

4. An arrangement as defined in claim 1 or 2 wherein said single pair of filters are constructed to operate digitally.

5. An arrangement as defined in claim 4 wherein said single pair of filters operate at a rate corresponding to the sampling rate of said pair of sampling means.

* * * * *